US009818313B2

(12) United States Patent
Damery et al.

(10) Patent No.: US 9,818,313 B2
(45) Date of Patent: Nov. 14, 2017

(54) CUSTOM SUMMARY VIEWS FOR SCREEN READER

(75) Inventors: Eric Damery, St. Petersburg, FL (US); Joseph Stephen, St. Petersburg, FL (US); Olga Espinola, St. Petersburg, FL (US)

(73) Assignee: Freedom Scientific, Inc., St. Petersburg, FL (US)

( * ) Notice: Subject to any disclaimer, the term of this patent is extended or adjusted under 35 U.S.C. 154(b) by 1580 days.

(21) Appl. No.: 11/623,529

(22) Filed: Jan. 16, 2007

(65) Prior Publication Data

US 2007/0168891 A1      Jul. 19, 2007

(51) Int. Cl.
G10L 13/00     (2006.01)
G09B 21/00     (2006.01)

(52) U.S. Cl.
CPC ............ *G09B 21/005* (2013.01); *G10L 13/00* (2013.01)

(58) Field of Classification Search
CPC .. G09B 21/001; G09B 21/002; G09B 21/003; G09B 21/004; G09B 21/005; G09B 21/006; G09B 21/007; G06F 17/246; G06F 17/2247; G06F 17/30; G06F 3/16; G06F 3/00; G06F 3/048; G06F 3/016
USPC .......................... 715/212, 865, 729; 434/116
See application file for complete search history.

(56) References Cited

U.S. PATENT DOCUMENTS 5,572,625 A     11/1996   Raman et al.
6,334,157 B1 *  12/2001   Oppermann et al. ......... 719/310
6,799,175 B2     9/2004   Aggarwal
7,493,560 B1 *   2/2009   Kipnes et al. ................. 715/729
7,624,355 B2 *  11/2009   Baneth .......................... 715/802
2003/0204815 A1 * 10/2003  Edwards et al. ............... 715/513
2004/0199870 A1 * 10/2004  Anderson ....................... 715/513
2005/0034063 A1 *  2/2005  Baker et al. ................... 715/513
2005/0071165 A1    3/2005  Hofstader et al.

(Continued)

OTHER PUBLICATIONS

Harrison, Feb. 2005, "Opening the Eyes of Those Who Can See", Computer Science Department, University of Wisconsin, Eau Claire, WI 54701, S.*

(Continued)

*Primary Examiner* — Stephen Hong
*Assistant Examiner* — Ahamed I Nazar
(74) *Attorney, Agent, or Firm* — Andriy Lytvyn; Anton J. Hopen; Smith & Hopen, P.A.

(57) ABSTRACT

A screen reader software product feature referred to as a custom summary view, or custom summary, has been developed. The custom summary feature solves the major problem faced by blind users when working with large sets of data. That problem occurs as a result of an inefficiency of gleaning important data from within these larger sets. The custom summary provides the ability to gather such data into a summary that can be navigated easily. This ease of navigation greatly levels the playing field in the competitive workplace for blind workers and students alike. Also taught is a feature, referred to as a multiple region support, which allows users to define blocks of contiguous cells containing data as "regions" when a document such as a spreadsheet is displayed by a screen reader. Regions can either be named by the user or be defined simply by the top left and bottom right cell addresses that represent the boundaries of the block of contiguous cells containing data.

9 Claims, 3 Drawing Sheets

(56) References Cited

U.S. PATENT DOCUMENTS

| | | | |
|---|---|---|---|
| 2005/0183002 A1 | 8/2005 | Chapus | |
| 2005/0273762 A1* | 12/2005 | Lesh | 717/115 |
| 2006/0090129 A1* | 4/2006 | Collie et al. | 715/513 |
| 2006/0090138 A1* | 4/2006 | Wang et al. | 715/760 |
| 2006/0095252 A1* | 5/2006 | Takagi | G06F 17/2247 704/200 |
| 2006/0282771 A1* | 12/2006 | Vinci | 715/530 |
| 2007/0100794 A1* | 5/2007 | Aaron | G09B 21/007 |
| 2008/0222165 A9* | 9/2008 | Friedman et al. | 707/100 |
| 2010/0150446 A1* | 6/2010 | Codignotto | 382/186 |

OTHER PUBLICATIONS

Stockman, Jul. 2004, "The Design and Evaluation of Auditory Access to Spreadsheets", Department of Computer Science, Queen Mary College, University of London, Mile End Road, London E1 4NS, United Kingdom.*

Stockman, Jul. 2005, "Auditory Graphs: A Summary of Current Experience and Towards", Department of Computer Science, Queen Mary College, University of London, Mile End Road, London E1 4NS, United Kingdom.*

Stockman, Jul. 2005, "Interactive Sonification of Spreadsheets", Department of Computer Science, Queen Mary College, University of London, Mile End Road, London E1 4NS, United Kingdom.*

Stockman, The Design and Evaluation of Auditory Access to Spreadsheets, Proceedings of ICAD 04—Tenth Meeting of the International Conference on Auditory Display, Sydney, Australia, Jul. 6-9, 2004, pp. 1-4.*

Stockman, An Examination of Mechanisms to Combine Speech and Sound for Data, Proceedings of ICAD 05—Eleventh Meeting of the International Conference on Auditory Display, Limerick, Ireland, Jul. 6-9, 2005, pp. 380-383.*

Stockman et al., Interactive Sonification of Spreadsheets, Proceedings of ICAD 05—Eleventh Meeting of the International Conference on Auditory Display, Limerick, Ireland, Jul. 6-9, 2005, pp. 134-139.*

Row and Column Headers in Word and Excel with JAWS 6.10, published Mar. 17, 2005, pp. 1-7.*

Web Page Accessibility: Tables by Georgia Southern University, published Apr. 2004, hereinafter as Georgia, pp. 1-7.*

JAWS 7.0 by Freedomscientific.com, published Oct. 29, 2005, hereinafter as JAWS, pp. 1-8.*

Web Page Accessibility: Tables by Georgia Southern University, published Nov. 2004, hereinafter as Georgia, pp. 1-7.*

Row and Column Headers in Word and Excel with JAWS 6.10, published by webaccessibility.gmu.edu in Mar. 17, 2005, pp. 1-7.*

Yesilada, Browsing Tables When You Cannot See Them, published Sep. 2000, pp. 1-132.*

Lazzaro, Taking the Mystery Out of Microsoft Active Accessibility, published Jul. 2000, pp. 1-6.*

Leventhal, How Accessible is Microsoft Office 2000? published Jul. 2000, pp. 1-6.*

Extended European Search Report dated Sep. 4, 2014 for corresponding European Patent Application No. 07716632.0.

* cited by examiner

|   | A | B | C | D | E | F |
|---|---|---|---|---|---|---|
| 1 |   | Denver | Phoenix | Dallas | Seattle | Totals |
| 2 | Large Widgets | 36 | 23 | 39 | 42 | 140 |
| 3 | Medium Widgets | 78 | 43 | 56 | 21 | 198 |
| 4 | Small Widgets | 8 | 19 | 11 | 57 | 95 |
| 5 | Total Widgets | 122 | 85 | 106 | 120 | 433 |
| 6 |   |   |   |   |   |   |
| 7 |   |   |   |   |   |   |
| 8 |   | Denver | Phoenix | Dallas | Seattle | Totals |
| 9 | Large Gizmo | 198 | 91 | 106 | 185 | 580 |
| 10 | Medium Gizmo | 95 | 102 | 72 | 61 | 330 |
| 11 | Small Gizmo | 123 | 40 | 58 | 118 | 339 |
| 12 | Total Gizmos | 416 | 233 | 236 | 364 | 1249 |
| 13 |   |   |   |   |   |   |
| 14 |   |   |   |   |   |   |
| 15 |   | Denver | Phoenix | Dallas | Seattle | Totals |
| 16 | Large Gadgets | 36 | 23 | 39 | 42 | 140 |
| 17 | Medium Gadgets | 78 | 43 | 56 | 21 | 198 |
| 18 | Small Gadgets | 8 | 19 | 11 | 57 | 95 |
| 19 | Total Gadgets | 122 | 85 | 106 | 120 | 433 |
| 20 |   |   |   |   |   |   |

Link to named cell for Total Widgets in Denver

Link to named cell for Total Gizmos in Denver

Link to named cell for Total Gadgets in Denver

FIG. 2

|    | A | B | C | D | E | F |
|----|---|---|---|---|---|---|
| 1  |   | Denver | Phoenix | Dallas | Seattle | Totals |
| 2  | Large Widgets | 36 | 23 | 39 | 42 | 140 |
| 3  | Medium Widgets | 78 | 43 | 56 | 21 | 198 |
| 4  | Small Widgets | 8 | 19 | 11 | 57 | 95 |
| 5  | Total Widgets | 122 | 85 | 106 | 120 | 433 |
| 6  |   |   |   |   |   |   |
| 7  |   |   |   |   |   |   |
| 8  |   | Denver | Phoenix | Dallas | Seattle | Totals |
| 9  | Large Gizmo | 198 | 91 | 106 | 185 | 580 |
| 10 | Medium Gizmo | 95 | 102 | 72 | 61 | 330 |
| 11 | Small Gizmo | 123 | 40 | 58 | 118 | 339 |
| 12 | Total Gizmos | 416 | 233 | 236 | 364 | 1249 |
| 13 |   |   |   |   |   |   |
| 14 |   |   |   |   |   |   |
| 15 |   | Denver | Phoenix | Dallas | Seattle | Totals |
| 16 | Large Gadgets | 36 | 23 | 39 | 42 | 140 |
| 17 | Medium Gadgets | 78 | 43 | 56 | 21 | 198 |
| 18 | Small Gadgets | 8 | 19 | 11 | 57 | 95 |
| 19 | Total Gadgets | 122 | 85 | 106 | 120 | 433 |
| 20 |   |   |   |   |   |   |

User preference specified for named region containing detail for Seattle widgets

FIG. 3

CUSTOM SUMMARY VIEWS FOR SCREEN READER

CROSS REFERENCE TO RELATED APPLICATIONS

This application claims priority to currently U.S. Provisional Patent Application 60/766,387 entitled, "Custom Summary Views for Screen Reader", filed Jan. 16, 2006, the contents of which are herein incorporated by reference.

FIELD OF INVENTION

This invention relates to screen reader software products. More specifically, this invention relates screen reader enhancements allowing a user to group and summarize data in an underlying document according to user preferences or other defined schema.

BACKGROUND OF THE INVENTION

Personal computers and the Internet greatly enhanced communications and access to information from around the world. Typically, visual information is displayed upon a monitor screen and data can be added or manipulated via keystrokes upon an associated keyboard. Feedback is provided visually to the user by the monitor screen. Blind users cannot utilize the information appearing upon the monitor screen while visually impaired users may experience difficulty doing so. Accordingly, screen readers have been developed to assist blind and visually impaired users when they use a personal computer.

Screen readers are devices that interpret display output typically viewed on a computer monitor and cause a voice synthesizer, Braille reader or other alternative device to output the same content. A well known screen reader is JAWS® available through Freedom Scientific, Inc. (St. Petersburg, Fla.). Screen readers are particularly useful for a blind or low vision user. One such screen reader is JAWS® for Windows. When installed upon a personal computer, JAWS® provides access to the operating system, software applications and the Internet. JAWS® includes a speech synthesizer that cooperates with the sound card in the personal computer to read aloud information appearing upon the computer monitor screen or that is derived through communicating directly with the application or operating system. Thus, JAWS® provides access to a wide variety of information, education and job related applications. Additionally, JAWS® includes an interface that can provide output to refreshable Braille displays. Current JAWS® software supports all standard Windows® applications, including Microsoft Office XP®. JAWS® supports Internet Explorer with special features, such as, links lists, frame lists, forms mode and reading of HTML labels and graphic labels included on web pages. Upon entering an HTML document via an Internet link, JAWS® actuates a Virtual PC Cursor that mimics the functions of the PC cursor. The Virtual PC cursor causes JAWS® to signal the speech synthesizer to speak the number of frames in a document being read in Internet Explorer and the number of links in the frame currently being displayed. Also, JAWS® causes the speech synthesizer to read graphics labeled by alternate tags in HTML code.

SUMMARY OF INVENTION

Screen readers have undergone rapid advances since they were introduced in the last decade. These innovations address the particular needs of their user segment by providing features that expand the utility of screen readers to enable blind or vision-impaired users to perform increasingly complex tasks or analyze data at more relevant levels of detail. The present invention further extends the functionality of screen reader programs by providing added functionality to allow users to quickly retrieve pertinent data and group data together in meaningful ways. A screen reader software product feature, referred to as a custom summary view, or custom summary, has been developed. The custom summary feature solves a major problem faced by blind or vision-impaired users when working with large sets of data. Where the location of data does not change as the data is manipulated but it is critical to find and use the data quickly, the ability to gather such data into a summary that can be navigated easily greatly levels the playing field in the competitive workplace for blind workers and in education for students. Although Microsoft Excel provides a feature called Custom Views, this feature does not resolve the problem or address the functionality solved by the present invention.

The custom summary feature allows users to create a snapshot of important data from a file such as Microsoft Excel file. The data from a worksheet can include items such as monthly totals, grand totals, and so on. Creators of a Microsoft Excel Worksheet can associate such data or ranges of data with labels, which include labels referred to in MS Excel as "names" used to define a particular cell or region of contiguous cells. Users of the screen reader can then define which data appear in the custom summary by selecting the assigned labels associated with the respective cells or groups of cells in the worksheet. The summary then displays the data of all the specified cells. The summary contains links, allowing users to move quickly to any of the cells selected. If the worksheet's data changes after the user's custom summary is created, the same custom summary can be used to obtain the new information without the need to re-specify the data to be displayed. JAWS displays summary information for all worksheets that have custom summary labels assigned in the current Microsoft Excel file.

Also taught is a feature that allows users to define blocks of contiguous cells containing data as "regions" when a document such as a spreadsheet is displayed by a screen reader. Regions can either be named by the user or be defined simply by the top left and bottom right cell addresses that represent the boundaries of the block of contiguous cells containing data. The feature renders a file, such as Microsoft Excel, more readily accessible to a blind user of the JAWS screen reader or other screen readers, where the application allows the author to use features of the application to designate title row/column header information.

The screen reader feature taught herein provides the aforementioned enhanced functionality. The screen reader is capable of determining title row/column header information automatically when special key names are used. Importantly, this feature will work even without the screen reader being installed at the time the file is created with these special key names. The user of such a file can transport a file containing such designated information from system to system, from screen reader installation to the next update of the screen reader, etc., without loosing the information and therefore having to re-create it. The user can override any document named title designations when desired, and return to using them if the designations have not been removed or changed. Also, title header information can be stored in a separate electronic file, a special designated area within the file itself that contains the designated title headers, or in any other type of relevant storage media, including random access memory, or device deemed appropriate. It will be possible to extend the current feature implementation to any application that offers similar features to those described above for Microsoft Excel. For example, extensions of the disclosed methodology have been applied to extracting desired data in the form of a custom summary from Microsoft Word tables.

In a first aspect the present invention provides a screen reader software product including a screen reader module communicatively coupled with resident software on a computer, a broadcast module communicatively coupled to the reader module and a schema module communicatively coupled to the broadcast module and the screen reader module. The schema module generates links to predefined labels in the resident software application, wherein the predefined labels are associated with underlying data and the links are established by the screen reader product for a user according to a selection of predefined labels stored in a set of preferences. The reader module is adapted to collect textual and non-textual display information generated by the resident software. The broadcast module adapted to communicate the display information collected by the reader module to an output device. In certain embodiments the label is a name in a Microsoft Excel application and the link is an executable link to the name in the application. The name in the application can be a name that references a cell or a region of cells. In certain embodiments the schema module searches for labels in the resident software application and presents the labels to a user for selection in the specification of user preferences for the resident software application. In certain embodiments the schema module applies user-defined identifiers to the links. The application of user-defined identifier facilitates the recognition of the data to be retrieved by executing the link by the user. In certain embodiments the schema module stores a plurality of user preferences. By allowing for more than one set of user preferences, the plurality of preferences allows for one or more users to define one or more preference settings to control the generation of linkages to labels in the resident software application. In this way, users with different needs can tailor the presentation of data to fit their particular needs. Furthermore, a single user can create multiple preferences where the need to interface with a particular application may change based upon a task to be performed by the user.

In a second aspect of the invention the schema module collects selected data associated with predefined labels in the resident software application and returns the selected data for output to a user. The label associated with the data is preselected by the user for output according to preferences stored in a user's preferences. The schema module can further be adapted to control the order of data output according to user preferences. In certain embodiments the schema module collects the label and the selected data associated with the label and returns the label and the selected data for output. In alternative embodiments the schema module applies user-defined identifiers to the selected data and returns the user-defined identifiers and the selected data for output to the user. In certain embodiments the schema module stores a plurality of user preferences. The plurality of preferences allows for one or more users to define one or more preference settings to control the output of a resident software application or file. In certain embodiments the resident software application is Microsoft Excel and the predefined labels are names referring to a cell or range of cells. In certain embodiments the schema module searches for labels in the resident software application and presents the labels to a user for selection in the specification of user preferences for the resident software application.

In a third aspect of the invention the schema module collects predefined labels in the resident software application and returns the associated data or links to labels associated with the underlying data to the user. The predefined labels are associated with underlying data and the return of data or generation of links are established by the screen reader product for a user according to the selections stored in a set of preferences.

In a fourth aspect of the invention the schema module collects data associated with defined ranges containing multiple data items in the resident software application and returns the data in the defined ranges or links to the range of data to the use. The defined ranges are preselected by a user for output according to user preferences. In certain embodiments the region is a region of cells in a Microsoft Excel application and the link is an executable link to the region in the application. In certain embodiments the schema module applies user-defined identifiers to the returned data or the links. The user-defined identifier facilitates the recognition of the data retrieved or to be retrieved by executing the link. In certain embodiments the schema module stores a plurality of user preferences. The plurality of preferences allows for one or more users to define one or more preference settings to control the output of a resident software application. In certain embodiments the schema module searches for labels associated with ranges in the resident software application and presents the labels to a user for selection in the specification of user preferences for the resident software application.

BRIEF DESCRIPTION OF THE DRAWINGS

For a fuller understanding of the invention, reference should be made to the following detailed description, taken in connection with the accompanying drawings, in which:

FIG. 2 is an illustration depicting the generation of links to named cells in a Microsoft Excel worksheet.

FIG. 3 is an illustration depicting the region support based upon user specified preferences in a Microsoft Excel worksheet as interfaced by a screen reader having a multiple region support function.

DETAILED DESCRIPTION OF THE PREFERRED EMBODIMENT

Figure 1:
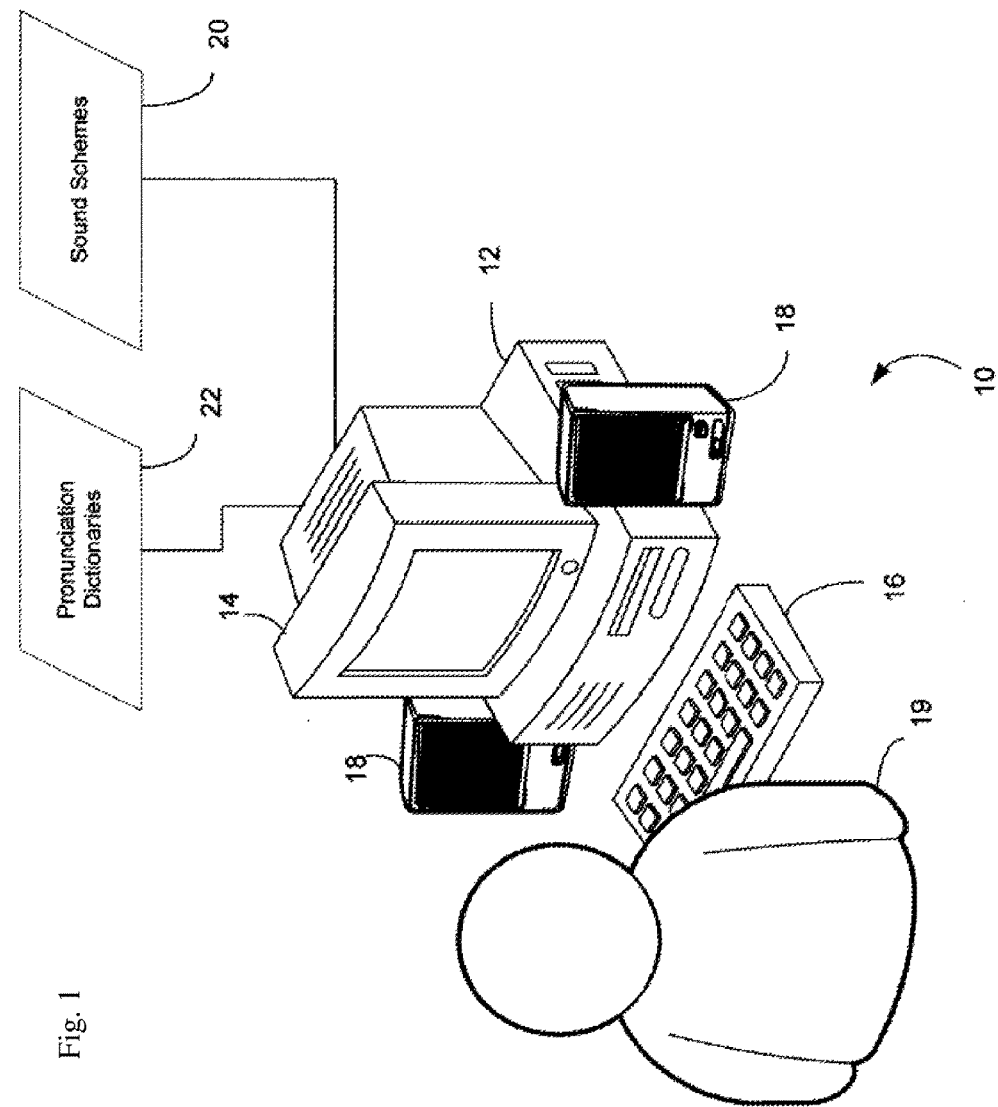
FIG. 1 is an illustration depicting the general user environment of a system according to the present invention.

A screen reader feature referred to as a custom summary view, or custom summary, is described that allows visually-impaired users to quickly and effectively to discern pertinent information about a large set of data. A user can create a snapshot of important data from a worksheet, such as monthly totals, grand totals, and so on. The user defines which cells appear in the custom summary by assigning labels to them. The summary then displays the contents of all the specified cells. The summary contains links, allowing the user to move quickly to any of the cells. If the worksheet's data changes after the custom summary is created, the same summary can be used to obtain the new information.

In the past, when working with a set of data such as can be found on a Microsoft Excel worksheet, blind users had to navigate through each cell on the worksheet or use features available in the screen reader to learn the location and relevance of important data. Once this was determined, users could use features of the screen reader to monitor changes in the data, track title headers associated with the data, etc. But remembering the location of the data and being able to obtain only that desired data quickly was not available.

The custom summary screen reader function described herein feature allows users to set and store, for future use, labels/identifiers for each cell or group of cells whose data is considered important. The information is stored on a per-user basis in each user's own screen reader user settings folder. This allows for multiple users of the same system to have unique personalized custom summaries for the same set of data. The screen reader custom summaries function allows a user to change the order of the labels used to display the summarized data. Thus, where a screen reader would by default display data according to the location of the data within a particular worksheet, the user may rearrange the order of display to an order more relevant to the user's needs. The names of the labels to be used to display the summarized data may also be changed to provide the most relevant labels/identifiers for the user. Additionally, a user may add or remove labels to be used to display the summarized data. The screen reader function allows for the display of the summarized data in a form that can be navigated quickly and effectively without altering the original file or layout of data in the file. Importantly, though, through the screen reader interface, the user is presented with the data and may revise the data as appropriate. A user employing the screen reader function can also navigate quickly to any cell containing the summarized data even if that cell is on a different worksheet from the current worksheet in the same file. For example, the user can specify the identifier/label associated with a named cell or region of cells and be brought directly to that location.

The ability to use names in Excel to define row and column titles has been extended to worksheets that have multiple regions. Names can define unique row and column titles for each region on a spreadsheet. In addition, JAWS screenreader can now detect if the active worksheet contains multiple regions. If the worksheet does, then multiple region support is automatically enabled in the Excel verbosity options.

With this new feature, a screen reader such as JAWS can summarize custom labels and display them to the user in a manner that facilitates easy and quick assimilation of the data. The following functionality is provided:
  The ability to present custom summaries of pertinent data to the user in Microsoft Excel and other applications.
  The ability to extend the current features developed for use in Excel to other applications based upon an extension to create custom labels features as found for instance in JAWS.
  The ability to allow the user to change the name of a worksheet for which custom labels have been defined and have the custom labels already in place remain in effect.
  The ability to create summaries of custom summaries for different workbooks or different files in the same application.
  The ability to enhance the method of presentation and ability to navigate a custom summary (i.e., listing summaries by heading, by application, etc.).

Also taught is a feature referred to as multiple region support that allows users to define blocks of contiguous cells containing data as "regions" when a document such as a spreadsheet is displayed by a screen reader. Regions can either be named a user or the creator of a worksheet. Alternatively, regions may be defined simply by the top left and bottom right cell addresses that represent the boundaries of the block of contiguous cells containing data.

The ability to analyze a spreadsheet's complex data structure and layout can greatly level the playing field in the competitive marketplace for blind workers. In order to work quickly and effectively with complex spreadsheets, blind users of Microsoft Excel must be able to grasp how each region's title row and column headers relate to any part of the spreadsheet. What is needed is a more comprehensive level of association between various regions of data.

In the past, a user of a screen reader using the reader to navigate a spreadsheet would first need to familiarize themselves with the spreadsheet by determining whether it has title rows and/or column headers in the first place, whether these change from region to region and the spreadsheet, and so on. Once acquainted with the specifics, users can use JAWS features to set which rows and/or columns JAWS will recognize as headers, and even set whether there are multiple regions on a spreadsheet. This method is still available to users, but has many shortcomings.

The major drawbacks to the method just described are:
  A blind user cannot quickly and effectively process information about the spreadsheet. It may take some time to learn enough about a spreadsheet's layout in order to decide what is a header row or column and how far it extends.
  Once a blind user has established where title row and column headers are located, these must be set manually through keystrokes or through the JAWS Verbosity Settings dialog using several of its options. This in turn generates a special file containing the information needed by JAWS in order to remember the settings just defined by the user. Each spreadsheet so defined has its own special file.
  If JAWS is updated or needs to be reinstalled for some reason, the user must re-establish the settings for each spreadsheet previously defined, or at the very least, a user must have saved the file JAWS needs in order to detect the settings for each spreadsheet so defined.

The present invention offers users a method by which, using Microsoft Excel's own feature for naming ranges and regions, a spreadsheet's author can define the title rows and/or column headers. Since the process of creating the worksheet does not involve the use of JAWS or other screenreader, it can be done without the screen reader ever being loaded or installed. This creates a truly portable scenario whereby a blind user of a screenreader can work immediately and productively with a file developed in this way.

The present invention offers a portable system and associated methods that can be used by the author of a Microsoft Excel spreadsheet or similar application with or without a screenreader installed to create Microsoft Excel files that are more readily accessible by blind users. When blind users of the screenreader work for the first time with files that include special names for regions, title row and column headers are automatically detected by the screenreader. This should greatly reduce the time it will take blind users to familiarize themselves with the data and begin to work with it effectively.

The invention will be further described by way of the following non-limiting examples.

Example 1. Development and Characterization of the Custom Summary View

The screen reader function of the present invention is referred to as a "custom summary view." Support for the implementation and development for the custom summary view requires use of the Microsoft Document Object Model (DOM). The JAWS scripting language was used to tap into the DOM.

The steps required are:

1. Create custom labels using a custom labeling feature. For instance, a custom summary labels dialog can be provided that gathers information about the current file and presents it to the user. When the user adds a custom label, an entry is created in a special file. The entry consists of the address of the cell or range of cells for the label along with the label itself. The set of labels for the current worksheet are stored as a section in the file to differentiate it from other groups of labels to be associated with other worksheets in the current workbook. The name of the file where all the information about the custom label is stored includes the name of the current workbook to differentiate it from custom summary information gathered for other workbooks. The parameters passed to the Custom Summary Labels dialog are obtained through the scripting language by tapping into the DOM. They include:

a. The address of a cell or range of cells, starting with the active cell or group of selected cells.
    b. The default content of the cell or group of cells that the user may rename as a user-defined label. This has absolutely no impact on the actual content of the data itself.
    c. The name of the current worksheet for which the label will be created.
    d. The name of the current file for which the custom summary will be created.

2. The Custom Summary Labels dialog presents the user with the following controls:

a. List Box
        This will contain the list of named Cells or named Cell Ranges. The format will be "<NAME> <CELL>" or "<NAME> <CELL-CELL>".
        Below are two examples:
        Grand Total G33
        Customer Info B2-E2
    b. "Add . . . " Button.
        Will contain the following controls:
        2.1. Static Label for Edit Box.→Will contain the text "Name For" with the cell name or cell range appended and then followed by a colon.
        2.2. Edit Box→Will contain the Name Default.
        2.3. "OK" Button.→Will insert entry into the list.
        2.4. "Cancel" Button.→Will abandon changes.
        2.5. "Change Name . . . " Button.→Same as the Add . . . dialog except the user will be able to change existing list entries.
        2.6. "Move Up" Button.→Move the current list item up.
        2.7. "Move Down" Button.→Move the current list item down."Remove" Button.
        The user will get a confirmation dialog after selecting this button.
        2.8. "Remove All" Button.→The user will get a confirmation dialog after selecting this button.
        2.9. "OK" Button.→Will write the changes. To ensure that the list items get written in the correct order the section will be deleted before writing the individual key entries.
        2.10. "Cancel" Button.→Will abandon changes.

3. Once the user has created custom labels for the current workbook, including possibly labels for multiple worksheets in the current workbook, a summary of the custom labels can be displayed. This is true even if:

The content of the data for any of the custom labels is changed.
    The user navigates to a different worksheet in the current workbook.
    The workbook is closed and later reopened.
    Another workbook is opened while the current one is still open.
    JAWS is unloaded and restarted.
    The system is restarted.

The View Custom Summary option is made available to the user via a keystroke and/or as an option from a list of JAWS features available for the current application. A Microsoft Excel has been developed. We use the virtual viewer to display the custom summary so that the user can navigate the summary for each worksheet in the current workbook, and if desired, move directly to any of the cells whose custom labels are shown in the summary. The information presented in the custom summary is gathered by:

1. Testing the special file where custom label information is stored for the current workbook. For each section that represents a custom summary for a worksheet in the current workbook, there is a section name that includes the name of the worksheet and the term "summary". When such a section name is found, its name is stored temporarily in memory so that it can be used as a heading for the custom summary for that worksheet. Then each of its entries are read temporarily in memory so that they can be used to populate the custom summary for that worksheet.

2. The custom summary is titled by the name of the current workbook which is obtained through the DOM and stored temporarily in memory when the application and the current file first gain focus. This is followed by the name of each worksheet in the current workbook that has a custom summary. Each custom label for a worksheet's custom summary is presented as a link. Each link contains the name of the custom label and the text of the cell it represents. Underneath each link is the address of the cell or range of cells the custom label represents.

3. By presenting each custom label as a link, the user is provided the ability to move directly to the cell represented by the custom label if desired. If enter is pressed on such a link, the virtual viewer containing the custom summary is dismissed, but since the cell address of the link is in memory, we use that cell address with the DOM to activate the cell. If a range of cells is represented by a link, we activate the first cell in the range.

4. If the user wishes to navigate a list of the links while the Custom Summary is being displayed, the JAWS feature to read a list of links is made available through the same keystroke users already know to use for a list of links in Internet Explorer and elsewhere. If a particular link in such a list is selected and Enter is pressed, we dismiss the links list, dismiss the Custom Summary, but move the user to the cell whose custom label is represented by the link in the link list. We can do this because the address of the cell represented by the link is in memory and we can use the DOM to activate that cell. If a range of cells is represented by a custom label link, we activate the first cell in the range.

Example 2. Development and Characterization of the Multiple Region Support

Presented below are is an explanation of the previous method used by a user to perform multiple region support along with the method according to the present invention. In order fully to understand the process JAWS uses to detect title row and column headers in a Microsoft Excel spreadsheet, it will be necessary to explain our old or standard method before describing the new one. The Microsoft Document Object Model (DOM) is used to tap into Microsoft Excel's own built-in capabilities.

Standard Method:

1. The user navigates to a cell, or selects a group of cells, to be designated as a row and/or column header.

2. The user presses a jaws-specific keystroke or uses the JAWS Verbosity Settings dialog to designate the active cell or group of selected cells. Depending on which keystroke or Verbosity Settings dialog options a user chooses, the cell or group of selected cells is designated as a title row, title column, or both a title row and column header.

3. JAWS uses a special file to store all information relevant to the current workbook in each user's personalized user settings folder. Where appropriate, we include the current worksheet's name as a section name in the file in order that JAWS can detect different settings for different worksheets in the current workbook. With respect to a cell address designated by the user as a title cell or group of cells, JAWS writes the cell address information into the special file. The name of this special file includes the name of the current workbook to differentiate it from other special files containing settings for other workbooks.

4. The cell address information stored in the file described above is broken up into its row and column components in order that JAWS can detect what row and/or column is a title row or column header as the user navigates from cell to cell. This information is also saved in memory so that the file does not need to be read every time a new cell gains focus. Instead the file is only read whenever the Microsoft Excel application gains focus and the particular workbook associated with the file gains focus, or the document window where cells for the current workbook can be manipulated gains focus.

5. As the user navigates through cells on the active worksheet in the current workbook, JAWS performs tests using saved information about the title row and/or column header cell addresses. We use an algorithm to test the address of the active cell against that of the title row or column header. Depending on the location of the active cell, JAWS accesses the DOM to determine the text of the title row and/or column header associated with the current cell. If it is appropriate to announce the header, JAWS speaks and/or displays it in Braille, then speaks and/or displays in Braille the content of the current cell. This provides the user with clear information about the meaning of the current cell's content relative to its associated headers.

6. If a user adds/deletes rows or columns relative to the location of the defined title row/column header row(s)/column(s), it is necessary to reset the designated title row/column information because JAWS has the old ones saved in the file described above.

7. If there is more than one region on the same worksheet, the user must first use a JAWS Verbosity Settings dialog option to inform JAWS that there are multiple regions. JAWS saves this information in the same file as described above, now including the name of the active worksheet. In this way, JAWS will be able to detect different settings for different worksheets in the current workbook.

8. The user must then navigate to the cell or group of cells in each region to be designated as a title row/column header. Then using either a JAWS-specific keystroke or the Verbosity Settings dialog options, the user must set the title row/column as previously described. The cell address information is saved in the file as previously described, except that we first determine the name of each region as defined by Microsoft Excel, then save the cell address information for each designated title row/column header with a section name that includes the region's name.

9. As previously described, if a user adds or deletes rows or columns relative to a title row or column header in any given region, the settings for headers must be reset manually because JAWS has the old ones stored in the file for the current workbook.

10. If JAWS needs to be re-installed or is updated, users must first save any special files stored by JAWS that contain the settings just described, then copy the special files into their personal user settings folder again.

New Method:

1. JAWS 6.10 introduced the ability for JAWS to support single region worksheets for document named regions. The special names include Title, ColumnTitle, and RowTitle, followed by a number. The special names are created by the document's author using the Names feature of Microsoft Excel whether JAWS is installed or loaded on the system at the time the file is created or the special document named titles are added to it. For single region support, the number following the special name refers to the number of the active worksheet. This works when the active worksheet contains only one region.

2. JAWS accesses the Dom to test whether the current workbook has user-defined names. If any of these names is one of the special names described above and it ends in the same number as the active worksheet, we save in memory the cell address information associated with the cell defined by the name.

3. As the user navigates through cells on the active worksheet in the current workbook, JAWS performs tests using the saved information about the title row and/or column header cell addresses. We use an algorithm to test the address of the active cell against that of the title row or column header. Depending on the location of the active cell, JAWS accesses the DOM to determine the text of the title row and/or column header associated with the current cell. If it is appropriate to announce the header, JAWS speaks and/or displays it in Braille, then speaks and/or displays in Braille the content of the current cell. This provides the user with clear information about the meaning of the current cell's content relative to its associated headers.

4. If a user adds/deletes rows or columns relative to the location of the defined title row/column header row(s)/column(s), it is not necessary to reset the designated title information because we refresh it automatically by retesting for the defined names in the active workbook and refreshing the cell address information in memory.

5. If a user wishes to use our standard method for designating title row and column headers instead of the document naming method, we provide a jaws feature to override document named titles through the JAWS Verbosity Settings dialog. The user can choose to override document named titles for all files or for just the current file. If the user chooses at a later time to return to the document named title method and the special title names have not been removed, the Override option can be turned off. At that time, JAWS will once again detect document named titles automatically.

6. In JAWS 7.0, we extended the method just describe to include support for multiple regions on the active worksheet. For this new automatic multiple region support, the user does not need to set multiple region support through the Verbosity Settings dialog. JAWS determines whether it should assume multiple region support. If JAWS finds more than one region with the special names for the active worksheet, multiple region support for the active worksheet is turned on automatically.

7. The special names for multiple regions on the active worksheet in principle use the same convention as the special names for single regions. That is, the names must begin with "Title", "columnTitle", or "RowTitle". For JAWS to see these special names as referring to regions, these special starting strings of characters must be followed by the word "Region".

8. For blocks of contiguous cells containing data, the only further item required is the number of the region in the active worksheet, delimited by a period, then followed by the number of the active worksheet. For example, TitleRegion1.1refers to the title row and column headers for the first block of contiguous cells containing data on Worksheet 1; columnTitleRegion3.2 refers to the column title header row for region 3 on Worksheet 2, etc.

9. The only caveat to the special naming method just described is that it does not take into account blank areas of a region that are considered to be within the region's boundaries. Microsoft Excel defines a region to be a block of contiguous cells containing data. Therefore, if a user wishes to define a region's title row or column headers for a group of cells not fully populated with data, Excel's definition of a region breaks down. We have devised a method to circumvent this shortcoming. When a user defines a name for a region with the special names we describe above, the boundaries for the region can be included in the name. JAWS uses this information in order to set the top left and bottom right of the region, rather than using Microsoft's own definition of a region as prescribed by the DOM.

10. To use our method of defining a region, the special string of characters of the name for the region must have the following form:
  A. Title/ColumnTitle/RowTitle followed by
  B. The number representing the number of the region on the active worksheet followed by a period delimiter followed by
  C. The cell address of the desired top left corner of the region followed by a period delimiter followed by
  D. The cell address desired to be the bottom right corner of the region followed by a period delimiter followed by
  E. The number representing the number of the active worksheet.

Notes: We use first letter uppercase convention for naming at all times as the feature assumes first-letter is uppercase. For example, a document named region could be defined at cell address C5 as TitleRegion1.C5.M50.1— meaning that 1) the region is bound by C5 at its top left corner and M50 at its bottom right corner, 2) it is the first region in Worksheet 1, and 3 it uses the row and column information from row 5 and column C of the spreadsheet as title row and column headers. If the document author selected cells C5 and C6 as title rows and columns at the time of creating this document named title region with the same name as just described, then Rows 5 and 6 would be considered title rows, and Column C would be considered the title Column. But the top left and right bottom corners of the region would still be C5 and M50 respectively. As long as the user or document author does not change the location of title cells, adds/deletes rows/columns, the information about document named titles for the active worksheet should be refreshed automatically. Therefore, if a user chooses to remove all document named titles, for example, or changes a document named title region to read only column titles or only row titles rather than both row and column titles, etc., JAWS automatically detects such changes.

11. If JAWS detects that there is more than one document named region on the active worksheet, we store each region's title cell address information in the user's personalized user settings folder in a special file. The filename includes the name of the current workbook. We use the DOM to determine the active worksheet name and number and store this information along with the special names that define document named regions as section names. We also store the pertinent cell address information in memory so that the file is only read as needed. It is read when
  a. The Microsoft Excel application gains focus and the current workbook has a special file associated with it, and when the active worksheet's name is contained in one of the section names in the file.
  b. The document window for the current workbook gains focus and the active worksheet's name is contained in one of the section names in the file.
  c. The active worksheet or workbook changes and there is a special file associated with it and the active worksheet's name is contained in one of the section names in the file.

12. When any of the above-mentioned changes occur causing the file to be read, a flag is set indicating whether document named titles and specifically document named region titles exist for the active worksheet and the current region of the worksheet. As the user navigates from cell to cell and the flag for document named regions is set, we read from the special file, using the appropriate document named section name that is associated with the active cell. JAWS performs tests to determine whether the active cell's address falls within the boundaries of the current region as defined by the region's special name. Since the special name specifically refers to the top left and bottom right boundaries of the region as we define it, rather than as the DOM defines a region, we can perform calculations to determine whether the current cell is within the boundaries.

13. If the active cell falls within our defined boundaries for the current region, we use the title header address information stored in memory to access the DOM for the title cell's contents, which is the header for the active cell. Where appropriate, JAWS then announces and displays in Braille the relevant title header information, followed by the active cells contents. This makes it clear to the user what title is associated with the active cell's contents, thereby greatly facilitating ease of use.

14. Technical Notes:
  a. In order to maintain this new code totally separate from existing code so as not to disturb existing functionality, all references to variables and functions include the string "DocNamed". All work for this feature is in our hidden code with very few references in our exposed scripting code for Microsoft excel in the form of one function call and one test for a flag.
  b. Whenever a focus change event occurs and the active worksheet gains focus, if the flag for document named regions is set, we refresh the special file, removing all document named sections and attempting to reread the names collection for the current workbook for any changes. The active worksheet gains focus when the user deactivates a menu, dismisses a dialog, or when the user Alt+tabs away and back to the application, or changes worksheets or workbooks, In such a case, a function is called to determine whether document named titles (and/or document named regions) exist for the active worksheet. If there is only one document named region in the active worksheet, the flag for document named titles is set and processing takes place without writing to a file as described above. However, if more than one document named region exists for the active worksheet, the flag for document named region titles is set, multiple region support flag is set, and the current document named region's title row/column information is placed into globals and used to populate the special file in the appropriate document name section. Furthermore, if our own defined boundary form is used as part of the document named title strings, a flag is set so that this information can supersede any DOM defined region information we may otherwise process.

It will be seen that the advantages set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween. Now that the invention has been described,

What is claimed is:

1. A non-transitory computer-readable media having computer-executable instructions that, in response to being executed by a computing device, cause the computing device to perform operations comprising:
   collecting tabular display information, the tabular display information comprising a cell address having alphanumeric data and a cell label for the cell address;
   retrieving cell labels corresponding to the cell address from a document object model file;
   generating a custom summary of cell labels selected by a screen reader user, the custom summary presenting the alphanumeric data for each cell address associated with the selected cell label, the alphanumeric data reordered according to screen reader user preferences without modifying the document object model file; and
   outputting the custom summary to an output device selected from the group consisting of a speech synthesizer and a Braille reader, whereby the broadcast module automatically broadcasts the alphanumeric data.

2. The non-transitory computer-readable media according to claim 1 further comprising outputting both the cell label and the alphanumeric data in the cell address associated with the cell label.

3. The non-transitory computer-readable media according to claim 1 further comprising presenting the cell labels to the screen reader user for selection in the specification of the custom summary.

4. The non-transitory computer-readable media according to claim 1 further comprising storing a plurality of screen reader user preferences, whereby the plurality of preferences allows for one or more screen reader users to define one or more preference settings to control the generation of custom summaries.

5. A non-transitory computer-readable media having computer-executable instructions that, in response to being executed by a computing device, cause the computing device to perform operations comprising:
   collecting tabular display information, the tabular display information comprising at least one region of cell addresses having alphanumeric data and a cell label for the region;
   reordering the alphanumeric data according to screen reader user preferences and to retrieve cell labels corresponding to the cell address from a document object model file; and
   generating a custom summary of the cell label for the at least one region of cell addresses selected by a screen reader user without modifying the document object model file; and
   communicating the custom summary to an output device selected from the group consisting of a speech synthesizer and a Braille reader, whereby the broadcast module automatically broadcasts a subset of the tabular display information, the subset comprising the alphanumeric data associated with the cell label for the at least one region of cell addresses that formed the custom summary.

6. The non-transitory computer-readable media according to claim 5 wherein the region is a region of cells in a Microsoft Excel application.

7. The non-transitory computer-readable media according to claim 5 further comprising applying screen reader user-defined identifiers to the returned subset of the tabular display information, whereby the screen reader user-defined identifier facilitates the recognition of the data retrieved.

8. The non-transitory computer-readable media according to claim 5 further comprising storing a plurality of screen reader user preferences, whereby the plurality of preferences allows for one or more screen reader users to define one or more preference settings to control the output of a software application.

9. The non-transitory computer-readable media according to claim 5 further comprising searching for cell labels associated with ranges in a software application and presenting the cell labels to a screen reader user for selection in the specification of screen reader user preferences for the software application.

* * * * *